United States Patent
Vedam et al.

(10) Patent No.: US 12,052,182 B2
(45) Date of Patent: *Jul. 30, 2024

(54) LATENCY-AWARE LOAD BALANCER FOR TOPOLOGY-SHIFTING SOFTWARE DEFINED NETWORKS

(71) Applicant: Juniper Networks, Inc., Sunnyvale, CA (US)

(72) Inventors: Jude Pragash Vedam, Bangalore (IN); Yuvaraja Mariappan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,036

(22) Filed: Apr. 11, 2023

(65) Prior Publication Data

US 2023/0308398 A1  Sep. 28, 2023

Related U.S. Application Data

(63) Continuation of application No. 17/305,045, filed on Jun. 29, 2021, now Pat. No. 11,658,918.

(30) Foreign Application Priority Data

May 17, 2021  (IN) .............................. 202141022023

(51) Int. Cl.
*H04L 47/762* (2022.01)
*H04L 43/0864* (2022.01)
(Continued)

(52) U.S. Cl.
CPC ........ *H04L 47/762* (2013.01); *H04L 43/0864* (2013.01); *H04L 43/10* (2013.01); *H04L 47/125* (2013.01); *H04L 47/781* (2013.01)

(58) Field of Classification Search
CPC ... H04L 47/762; H04L 43/0864; H04L 43/10; H04L 47/125; H04L 47/781; H04L 47/83
See application file for complete search history.

(56) References Cited

U.S. PATENT DOCUMENTS 9,571,394 B1  2/2017  Sivaramakrishnan et al.
9,602,377 B2 *  3/2017  Agarwal ................. H04L 43/04
(Continued)

FOREIGN PATENT DOCUMENTS

WO  2013184846 A1  12/2013

OTHER PUBLICATIONS

"PCI-SIG SR-IOV Primer: An Introduction to SR-IOV Technology," Rev. 2.5, Intel Corp., Jan. 2011, 28 pp.
(Continued)

*Primary Examiner* — Kibrom T Hailu
(74) *Attorney, Agent, or Firm* — Shumaker & Sieffert, P.A.

(57) ABSTRACT

Techniques are described for performing latency-aware load balancing. In some examples, a computing device communicably coupled to a plurality of service endpoints that are in motion with respect to the computing device may receive data to be processed. The computing device may select, based at least in part on a communication latency of each of the plurality of service endpoints and a predicted compute latency of each of the plurality of service endpoints, a service endpoint out of the plurality of service endpoints to process the data. The computing device may send the data to the selected service endpoint for processing.

20 Claims, 6 Drawing Sheets

(51) Int. Cl.
*H04L 43/10* (2022.01)
*H04L 47/125* (2022.01)
*H04L 47/78* (2022.01)

(56) References Cited

U.S. PATENT DOCUMENTS

| | | | |
|---|---|---|---|
| 11,238,041 B2* | 2/2022 | Kondiles | G06F 16/24532 |
| 11,658,918 B2* | 5/2023 | Vedam | H04L 47/83 |
| | | | 370/235 |
| 2010/0332650 A1 | 12/2010 | Aisen et al. | |
| 2017/0251068 A1 | 8/2017 | Kappler et al. | |
| 2019/0215256 A1 | 7/2019 | Dhanabalan et al. | |
| 2020/0092181 A1 | 3/2020 | Thiagarajan et al. | |
| 2020/0201679 A1 | 6/2020 | Wentz | |
| 2020/0320340 A1 | 10/2020 | Wentz | |
| 2021/0135983 A1 | 5/2021 | Farnham | |
| 2021/0320853 A1 | 10/2021 | Kulshreshtha et al. | |
| 2022/0004413 A1 | 1/2022 | Vetter et al. | |
| 2022/0368646 A1 | 11/2022 | Vedam et al. | |

OTHER PUBLICATIONS

Mackie et al., "BGP-Signaled End-System IP/VPNs," draft-ietf-l3vpn-end-system-06, Dec. 15, 2016, 31 pp.
Prosecution History from U.S. Appl. No. 17/305,045, dated Jul. 11, 2022 through Jan. 11, 2023, 34 pp.
Rosen et al., "BGP/MPLS IP Virtual Private Networks (VPNs)," Request for Comments 4364, Internet Engineering Task Force Network Working Group, Feb. 2006, 47 pp.

* cited by examiner

LATENCY-AWARE LOAD BALANCER FOR TOPOLOGY-SHIFTING SOFTWARE DEFINED NETWORKS

This application is a continuation of U.S. application Ser. No. 17/305,045 filed Jun. 29, 2021, which is a utility with foreign priority of Indian Provisional Patent Application No. 202141022023, filed May 17, 2021, the entire contents of which are incorporated herein by reference.

TECHNICAL FIELD

The disclosure relates to a virtualized computing infrastructure and, more specifically, to performing latency-aware load balancing to improve the performance of topology-shifting software defined networks.

BACKGROUND

In a typical cloud data center environment, a large collection of interconnected servers provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world, with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

A load balancer can be configured for the virtualized computer infrastructure. Pods can be abstracted by a service to represent a so-called "backend" of the load balancer to requests issued to the service. Client modules can access the load balancer using the service Internet Protocol (IP) address of the load balancer, regardless of any changes to the backends, so that the load balancer provides a pod-agnostic way to use the functionalities provided by the currently-active pods.

In particular, the load balancer may perform load balancing by performing equal-cost multipath (ECMP) routing, which is a mechanism for routing data traffic across multiple paths of equal costs to computing resources. To perform ECMP routing of data traffic, the load balancer may calculate a hash of the header of an incoming data packet and may select a pod out of a set of pods in the backend of the load balancer to process the data traffic based on the calculated hash value.

SUMMARY

In general, techniques are described for performing latency-aware load balancing of a topology-shifting software defined network. In a topology-shifting software defined network, computing resources are not necessarily situated at a fixed distance from a load balancing device. Instead, the computing resources may move and change positions with respect to the load balancing device and/or with respect to each other. For example, the computing resources may part of a flying swarm of drones, low Earth orbit satellites, vehicles, ships, and the like that are in motion.

As computing resources are in motion, the changing distances between the computing resources and the load balancing device may cause the communication latency to transfer data from the computing device to the computing resources to change. For example, a computing resource that moves away from the load balancing device may cause the communication latency between the load balancing device and the computing resource to increase, while the computing resource that moves towards the load balancing device may cause the communication latency between the computing device and the computing resource to decrease. As such, a load balancing device that does not take into account of changes in latencies of computing resources may not be able to optimally perform load balancing of such computing resources.

In accordance with aspects of the present disclosure, a load balancing device may perform latency-aware load balancing of computing resources by taking into account of changes in latencies of the computing resources. Specifically, the load balancing device may receive data to be processed by one of the computing resources, and may route the data to the computing resource having the lowest latency out of the computing resources, thereby improving the performance in processing the data.

In one example, this disclosure describes a method includes receiving, by a computing device communicably coupled to a plurality of service endpoints that are in motion with respect to the computing device, data to be processed; selecting, by the computing device and based at least in part on a communication latency of each of the plurality of service endpoints and a predicted compute latency of each of the plurality of service endpoints, a service endpoint out of the plurality of service endpoints to process the data; and sending, by the computing device, the data to the selected service endpoint for processing.

In another example, this disclosure describes a computing device includes a memory; processing circuitry coupled to the memory and configured to: receive data to be processed by one of a plurality of service endpoints communicably coupled to the computing device and that are in motion with respect to the computing device; select, based at least in part on a communication latency of each of the plurality of service endpoints and a predicted compute latency of each of the plurality of service endpoints, a service endpoint out of the plurality of service endpoints to process the data; and send the data to the selected service endpoint for processing.

In another example, this disclosure describes a computer-readable storage medium includes receive data to be processed by one of a plurality of service endpoints communicably coupled to the computing device and that are in motion with respect to the computing device; select, based at least in part on a communication latency of each of the plurality of service endpoints and a predicted compute latency of each of the plurality of service endpoints, a service endpoint out of the plurality of service endpoints to process the data; and send the data to the selected service endpoint for processing.

The details of one or more examples are set forth in the accompanying drawings and the description below. Other features, objects, and advantages will be apparent from the description, drawings, and claims.

DETAILED DESCRIPTION

In general, techniques are described for performing latency-aware load balancing of a topology-shifting software defined network. In a topology-shifting software defined network, computing resources are not necessarily situated at a fixed distance from a load balancing device. Instead, the computing resources may move and change positions with respect to the load balancing device and/or with respect to each other. For example, the computing resources may part of a flying swarm of drones, low Earth orbit satellites, vehicles, ships, and the like that are in motion.

The latency of a computing resource may be based at least in part on two latency components: communication latency and compute latency. Communication latency may be latency associated with a load balancer communicating with the computing resource, and may be based on factors such as the distance between the load balancer and the computing resource. Meanwhile, compute latency of a computing resource may be the latency associated with the computing resource processing data, and may be based on factors such as processor utilization, memory utilization, disk input/output, and the like of the computing resource.

When determining how to route data traffic that can be serviced by a plurality of computing resources, a latency-aware load balancer determine the latency associated each of the plurality of computing resources by determining, for each computing resource, both the communication latency and the compute latency of the computing resource, and determining the latency associated with the computing resource as a sum of the communication latency of the computing resource and the compute latency of the computing resource. The latency-aware load balancer may therefore determine the latency associated each of the plurality of computing resources and route (e.g., send) data traffic to the computing resource having the lowest latency out of the plurality of computing resources. In this way, the latency-aware load balancer reduces or minimizes the latency in servicing data traffic, thereby improving performance of a topology-shifting software defined network.

Figure 1:
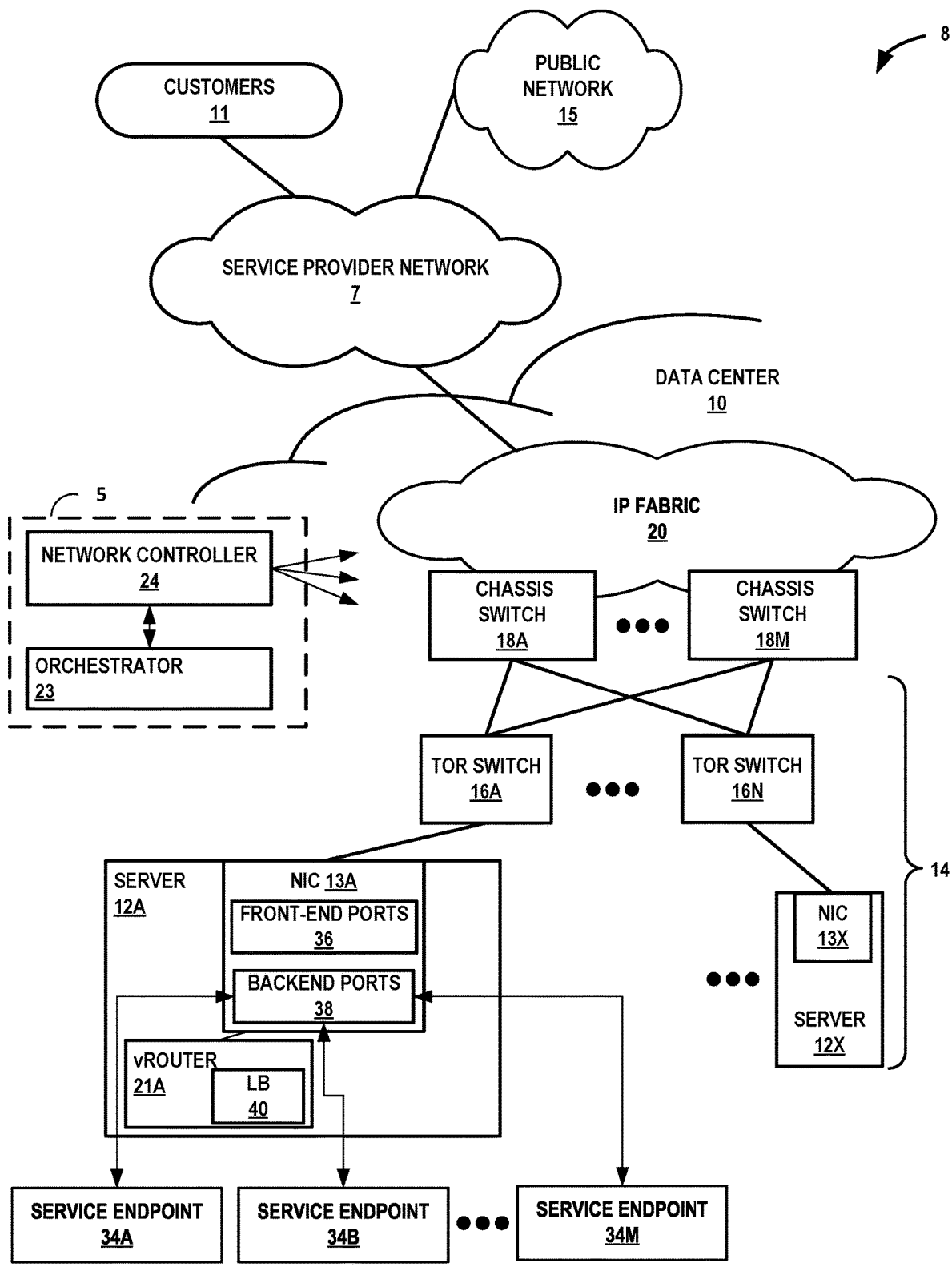
FIG. 1 is a block diagram illustrating an example computing infrastructure in which examples of the configurations and techniques described herein may be implemented.

FIG. 1 is a block diagram illustrating an example computing infrastructure 8 in which examples of the configurations and techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls.

Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack (TOR) switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes.

In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks, unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a data center 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers may run in the kernels or hypervisors of the virtualized servers 12, or may run in the user space of the virtualized servers 12 to create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance.

The underlay physical routers and switches might not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, any of virtual routers 21 may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). The forwarding tables may also contain level 2 overlays and level 3 overlays. No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries.

In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks. Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network.

For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link and to exchange packets with service endpoints 34A-34M ("service endpoints 34"). For example, server 12A includes NIC 13A. Any of NICs 13 may provide one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12.

As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints.

In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-IOV Primer: An Introduction to SR-IOV Technology," Rev. 2.5, Intel Corp., January, 2011, which is incorporated herein by reference in its entirety.

NIC 13A of server 12X may include front-end ports 36 that connects to TOR switches 16 to exchange packets with TOR switches 16 over a communication link, and backend ports 38 that connects to service endpoints 34 to exchange packets with service endpoints 34 over communication links. Front-end ports 36 and backend ports 38 may be any suitable network interface ports, such as ethernet ports, WiFi ports, and the like.

One or more of servers 12 may each include a virtual router 21 that executes one or more routing instances for corresponding virtual networks within data center 10 to route packets among service endpoints 34. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination endpoints (e.g., one of service endpoints 34) for the packets. For server 12A, for example, for each of the packets outbound from service endpoints 34 connected to server 12A, the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by service endpoints 34 to generate tunnel packets and decapsulate tunnel packets to obtain inner packets for routing to other service endpoints.

Computing infrastructure 8 implements an automation platform for automating deployment, scaling, and operations of elements across servers 12 and service endpoints 34 to provide virtualized infrastructure for executing application workloads and services. Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints and/or service endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed 5 Jun. 2013, entitled "PHYSICAL PATH DETERMINATION FOR VIRTUAL NETWORK PACKET FLOWS;" and in U.S. patent application Ser. No. 14/226,509, filed 26 Mar. 2014, entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes provides a container management platform that provides portability across public and private clouds, each of which may provide virtualization infrastructure to the container management platform.

Virtual router 21A is configured to send packets received from the virtual network to service endpoints 34 and to send packets received from service endpoints 34 on the virtual network. Service endpoints 34 may be computing resources of vehicles may move and change positions with respect to server 12A. For example, service endpoints 34 may be computing devices that include processing circuitry that are a part of drones, low Earth orbit satellites, vehicles, ships, and the like that are in motion with respect to server 12A. In some examples, processing circuitry of service endpoints 34 may execute virtual execution elements such as virtual machines, containers, pods, and the like.

Virtual router 21A is configured to implement a service using service endpoints 34. Network controller 24 and/or orchestrator 23 may configure server 12A to connect to service endpoints 34 via backend ports 38, and virtual router 21A may be configured to receive, from network controller 24 and/or orchestrator 23, a service definition for a service, that specifies the backend virtual network to be used for exposing backends to the service and virtual router 21A may expose service endpoints 34 to the service.

Virtual router 21A may allocate a unique IP addresses within a virtual network for each service endpoint of service endpoints 34 in a service, and may also allocate a service IP address for service endpoints 34 which is the same for all service endpoints in a service to use as a service address. The service IP address may be a floating IP address in some examples. The service IP address is used to send traffic into the service from, for example, pods in other services, or from external clients or servers.

Virtual router 21A may implement the service using a load balancer, such as load balancer 40. Load balancer 40 may be a specialized hardware appliance or is implemented in virtual router 21A and may be configured to cause traffic to the service IP address for the service received by server 12A to be load balanced among service endpoints 34. That is, when virtual router 21A receives data traffic to the service IP address allocated for service endpoints 34, virtual router 21A may perform load balancing to forward the data traffic to one of the service endpoints 34.

In some examples, when traffic is sent to a service IP address allocated to endpoints 34, virtual router 21A may use load balancer 40 to perform latency-aware load balancing to resolve the service IP address to the interfaces of the individual service endpoints 34 that form the destination service. That is, because service endpoints 34 may be in motion, the physical distance between each of service endpoints 34 and virtual router 21A might not remain constant. As such, the latency of a service endpoint, which is the latency for the service endpoint to receive data traffic and to process the data traffic may occasionally, periodically, or constantly change.

The latency of a service endpoint of service endpoints 34 may be based at least in part on two latency components: communication latency and compute latency. Communication latency may be latency associated with server 12A communicating with the service endpoint, and may be based on factors such as the distance between server 12A and the service endpoint, the type of communication link between server 12A and the service endpoint, and the like. Meanwhile, compute latency of a service endpoint may be the latency associated with the service endpoint processing data, and may be based on factors such as processor utilization, memory utilization, disk input/output, and the like of the service endpoint.

When determining how to route data traffic sent to the service IP address allocated to service endpoints 34, virtual router 21A may use load balancer 40 to determine the latency associated each of service endpoints 34 by determining, for each service endpoint of service endpoints 34, both the communication latency and the compute latency of the service endpoint, and determining the latency associated with the service endpoint as a sum or other function of the communication latency of the service endpoint and the compute latency of the service endpoint. Virtual router 21A may therefore determine the latency associated each of service endpoints 34 and route (e.g., send) data traffic sent to the IP address to the service endpoint having the lowest latency out of service endpoints 34. In this way, virtual router 21A reduces or minimizes the latency in servicing data traffic, thereby improving performance of computing infrastructure 8.

Figure 2:
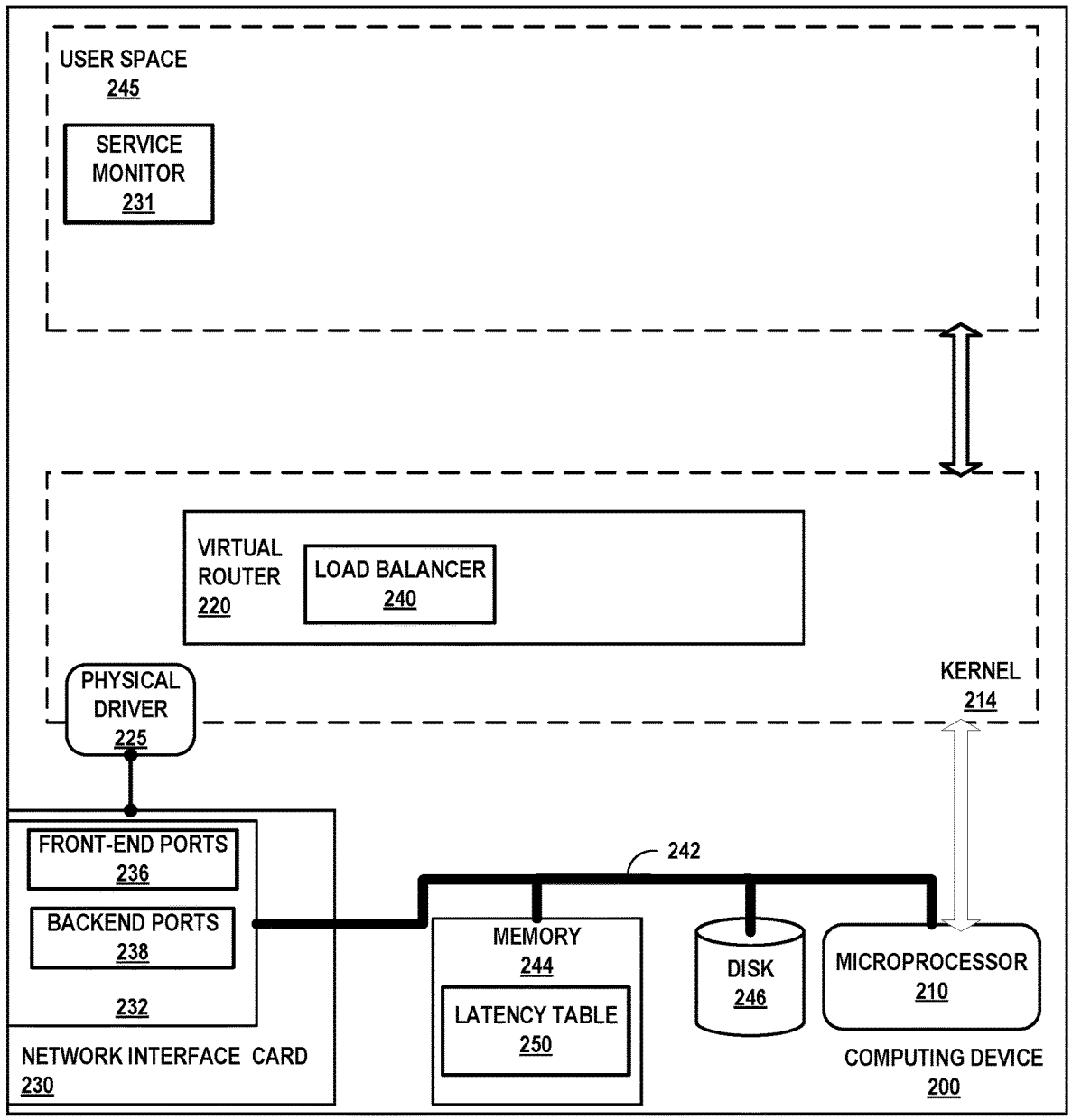
FIG. 2 is a block diagram of an example computing device (e.g., host) that performs latency-aware load balancing, according to techniques described in this disclosure.

FIG. 2 is a block diagram of an example computing device (e.g., host) that performs latency-aware load balancing, according to techniques described in this disclosure. Computing device 200 of FIG. 2 may represent a real or virtual server and may represent an example instance of any of servers 12 of FIG. 1, such as server 12A. Computing device 200 includes, in this example, a bus 242 coupling hardware components of a computing device 200 hardware environment.

Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor). Microprocessor 210 may represent processing circuitry of various types, such as fixed function circuitry, programmable circuitry, or any combination of fixed function circuitry and programmable circuitry that is operable to execute instructions stored to volatile or non-volatile memory to perform various actions.

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. For example, interface 232 includes front-end ports 236 similar to front-end ports 36 of FIG. 1 and backend ports 238 similar to backend ports 38 of FIG. 1. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, a Data Plane Development Kit (DPDK) based host application, or a virtual machine in various implementations.

Virtual router 220 may replace and subsume the virtual routing/bridging functionality of the Linux bridge/OVS module that is commonly used for Kubernetes deployments of pods. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

In one example, network packets, e.g., layer three (L3) IP packets or layer two (L2) Ethernet packets generated or consumed by service endpoints in the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220.

This functionality is referred to herein as "tunneling," and may be used to create one or more overlay networks. Besides IPinIP, other examples of tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any service endpoints connected to computing device 200, and virtual router 220 exchanges packets with service endpoints connected to computing device 200 using a bridge of NIC 230.

As described above, network controller 24 illustrated in FIG. 1 may provide a logically centralized controller for facilitating operation of one or more virtual networks. Network controller 24 may, for example, maintain a routing information base, e.g., one or more routing tables that store routing information for the physical network as well as one or more overlay networks. Virtual router 220 implements one or more virtual routing and forwarding instances (VRFs) for respective virtual networks for which virtual router 220 operates as respective tunnel endpoints.

In general, each VRF stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of the VRFs may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to a VRF. The VRF may include forwarding information for the inner packet. For instance, the VRF may map a destination layer 3 address for the inner packet to a virtual network interface, and may forward the inner packet via the virtual network interface to a service endpoint.

Service endpoints connected to computing device 200 may generate a layer 3 inner packet destined for a destination virtual network endpoint that is executed by another computing device (i.e., not computing device 200) or for another service endpoint connected to computing device 200. Virtual router 220 receives the inner packet and layer 2 header and determines a virtual network for the inner packet. Virtual router 220 may determine the virtual network using any of the above-described virtual network interface implementation techniques. Virtual router 220 uses the VRF corresponding to the virtual network for the inner packet to generate an outer header for the inner packet, the outer header including an outer IP header for the overlay tunnel and a tunnel encapsulation header identifying the virtual network.

Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate virtual network endpoint for the virtual network endpoint.

In some examples, a controller for computing device 200 (e.g., network controller 24 of FIG. 1) configures a default route in each of the virtual routers (e.g., virtual router 220) connected to computing device 200 to cause virtual router 220 to be used as an initial next hop for outbound packets. In some examples, NIC 230 is configured with one or more forwarding rules to cause all packets received from the service endpoints connected to computing device 200 to be switched to virtual router 220.

Virtual router 220 of computing device 200 may perform latency-aware load balancing to send traffic destined for a service IP address associated with service monitor 231 to a service endpoint having the lowest latency out of the service endpoints connected to computing device 200 to process the traffic. To that end, virtual router 220 may include or use load balancer 240, similar to load balancer 40 of FIG. 1, to continuously determine the latency of each of the service endpoints connected to computing device 220 and to store associations of each service endpoint connected to computing device 200 with the service endpoint's latency value in latency table 250 in memory 244. When computing device 200 receives data traffic destined for a service IP address associated with service monitor 231, computing device 200 may use latency table 250 to determine the service endpoint having the lowest latency out of the service endpoints connected to computing device 200 to process the traffic, and may forward the traffic to the determined service endpoint via backend ports 238.

Figure 3A:
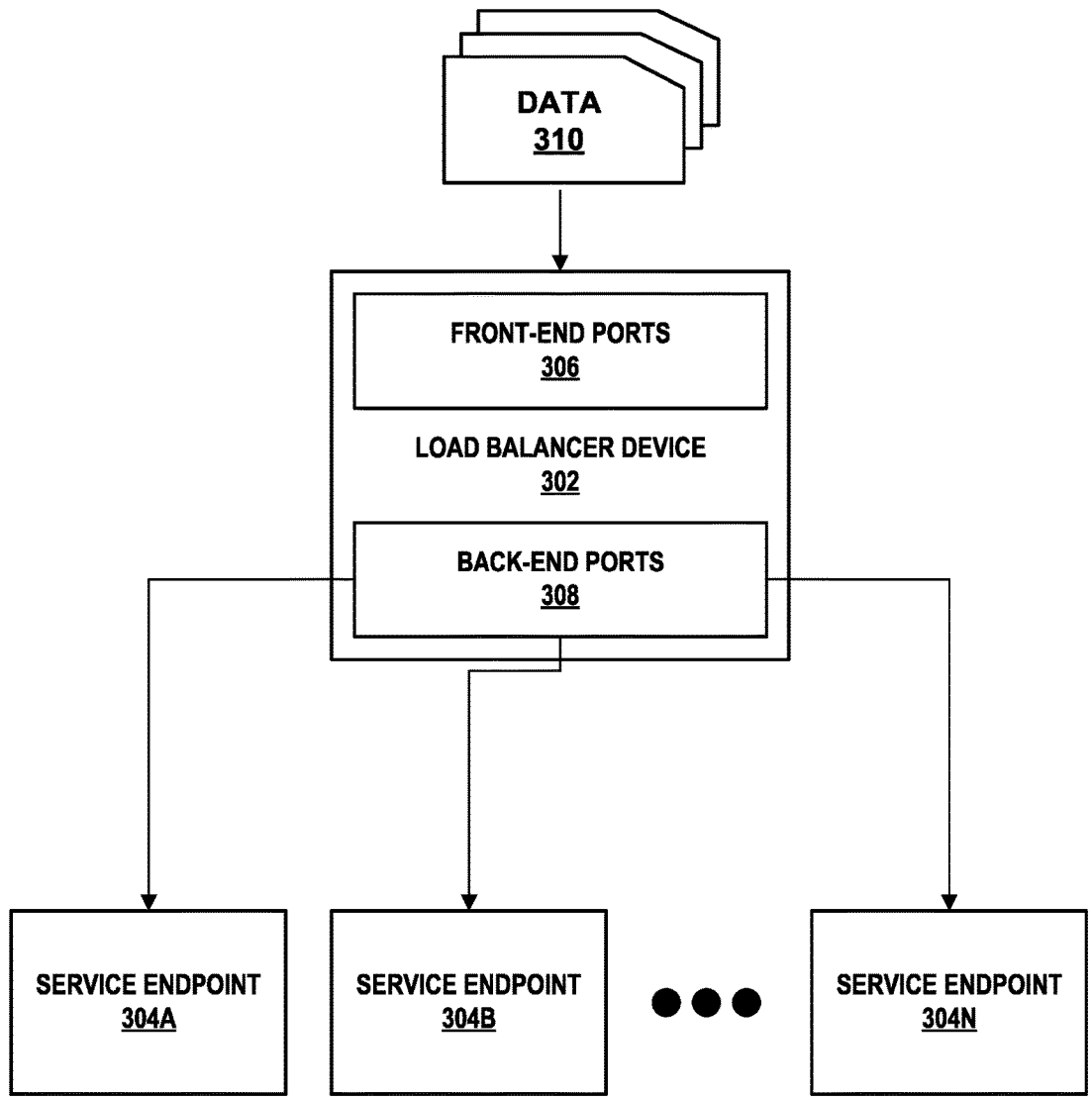
FIGS. 3A-3C are block diagrams illustrating an example computing device that performs latency-aware load balancing in further detail, in accordance with aspects of the present disclosure.
Figure 3B:
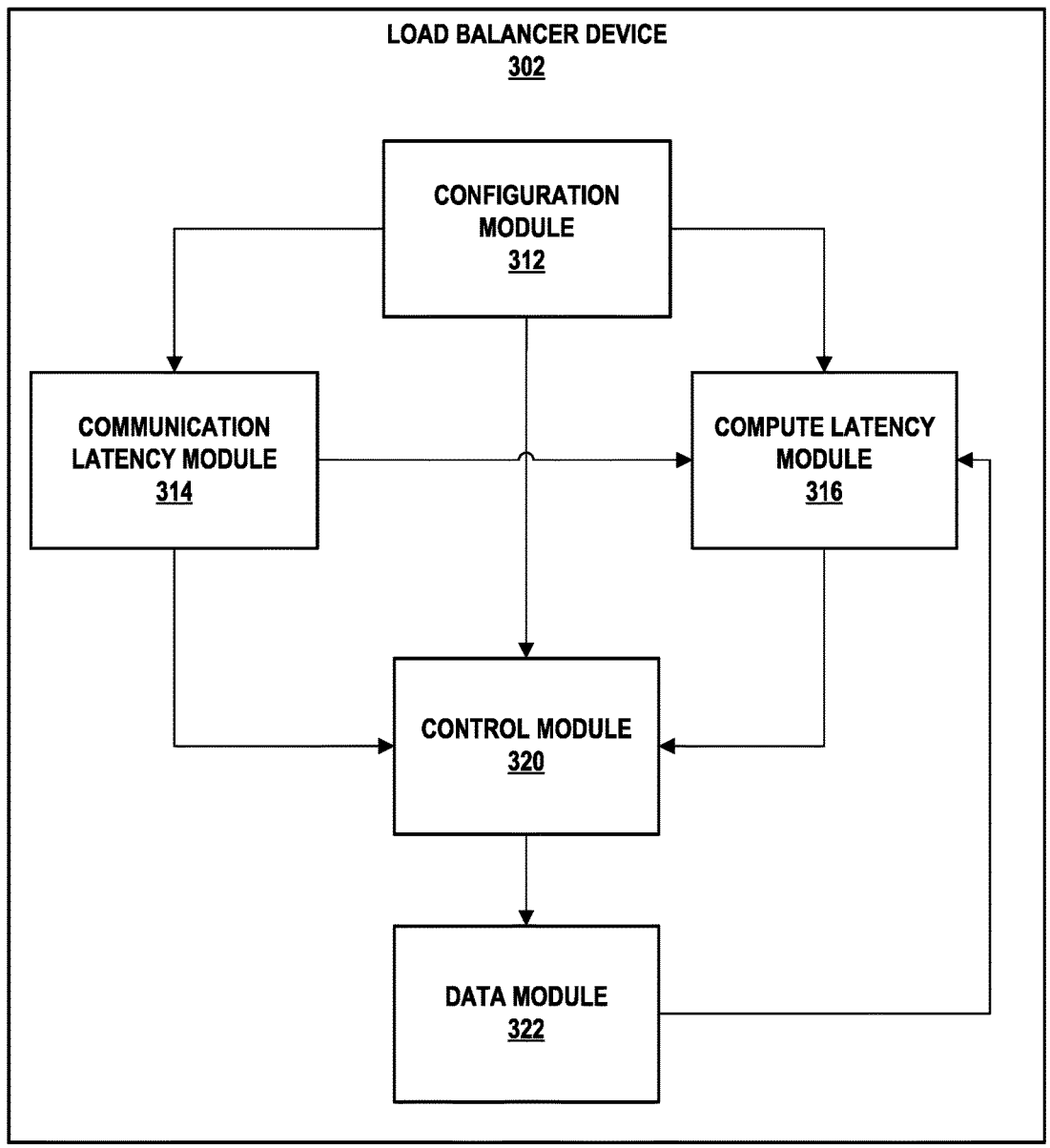
Figure 3C:
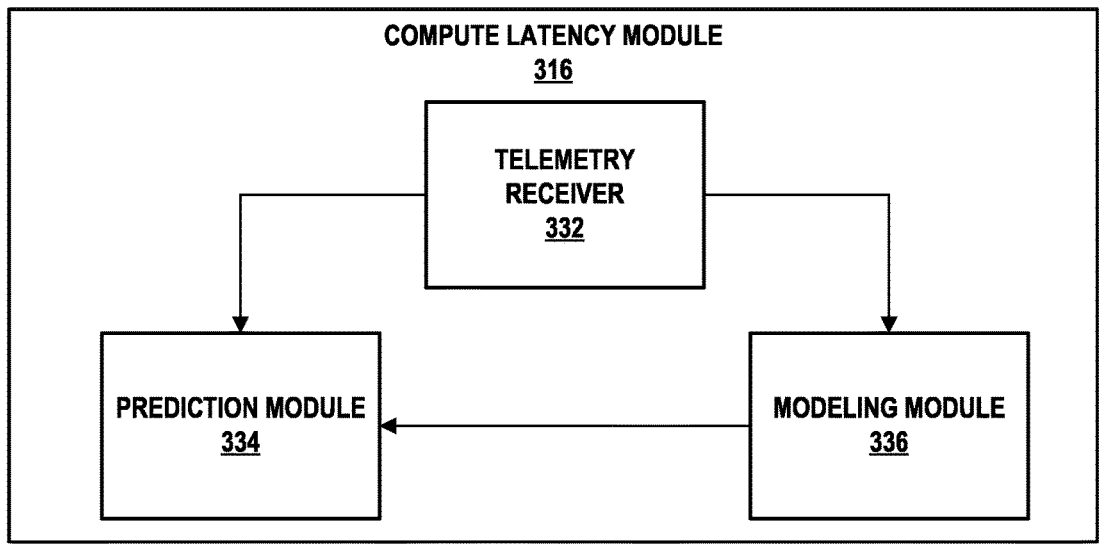

FIGS. 3A-3C are block diagrams illustrating an example computing device that performs latency-aware load balancing in further detail, in accordance with aspects of the present disclosure. As shown in FIG. 3A, load balancer device 302 may be an example of one of servers 12 in FIG. 1 or an example of computing device 200 in FIG. 2, and may represent a compute server, switch, or storage server. For example, load balancer device 302 may represent a computing device, such as an x86 processor-based server. Load balancer device 302 may include front-end ports 306, similar to front-end ports 36 in FIG. 1 and front-end ports 236 in FIG. 2, and backend ports 308 similar to backend ports 38 in FIG. 1 and backend ports 238 in FIG. 2. Front-end ports 306 and backend ports 308 may include any suitable communication ports for communicating with other devices. For example, front-end ports 306 and backend ports 308 may be virtual network interfaces.

Load balancer device 302 is communicably coupled, via backend ports 308, to service endpoints 304A-304N ("service endpoints 304"). Service endpoints 304 may be examples of service endpoints 34 in FIG. 1, and may represent computing devices that may move with respect to load balancer device 102, so that the physical distance between load balancer device 302 and each of service endpoints 304 may change over time. Load balancer device 302 may receive data 310 via front-end ports 306, such as in the form of data packets, and may route data 310 to service endpoints 304 for processing. Load balancer device 302 may perform load balancing to determine which of the service endpoints out of the multiple service endpoints 304 is to process data 310 received by load balancer device 302.

Specifically, load balancer device 302 may perform latency-aware load balancing for service endpoints 304. To that end, when load balancer device 302 receives data 310, load balancer device 302 may determine the service endpoint having the lowest latency out of service endpoints 304, and may route data 310 to the service endpoint having the lowest latency for processing.

The latency of a service endpoint may be based at least in part on two latency components: communication latency and compute latency. Communication latency may be latency associated with load balancer device 302 communicating with the service endpoint, and may be based on factors such as the distance between load balancer device 302 and the service endpoint, the type of communication link between load balancer device 302 and the service endpoint, and the like. Meanwhile, compute latency of a service endpoint may be the latency associated with the service endpoint processing data, and may be based on factors such as processor utilization, memory utilization, disk input/output, and the like of the service endpoint.

When determining how to route data 310, load balancer device 302 may determine the latency associated each of service endpoints 304 by determining, for each service endpoint, the communication latency and the compute latency, and determining the latency associated with a service endpoint as a sum of the communication latency of the service endpoint and the compute latency of the service endpoint. Load balancer device 302 may therefore determine the latency associated each of service endpoints 304 and route data 310 to the service endpoint having the lowest latency out of service endpoints 304.

As shown in FIG. 3B, load balancer device 302 may include configuration module 312, communication latency module 314, compute latency module 316, control module 320, and data module 322. Configuration module 312, communication latency module 314, compute latency module 316, control module 320, and data module 322 may be software applications, services, and the like that include instructions that are executed by one or more processors or processing circuitry of load balancer device 302. For example, configuration module 312, communication latency module 314, compute latency module 316, control module 320, and data module 322 may be examples of software portions of load balancer 40 of FIG. 1 and load balancer 240 of FIG. 2.

Configuration module 312 may be configured to provide one or more interfaces through which load balancer device 302 can be programmed and/or configured to perform load balancing. For example, configuration module 312 may provide application programming interfaces (APIs), such as representational state transfer (REST) APIs, a command line interface, a Transmission Control Protocol (TCP) streaming interface, etc.

Communication latency module 314 may be configured to determine the communication latency of each of service endpoints 304. Communication latency module 314 may be configured with one or more configuration parameters associated with each of service endpoints 304, such as configuration parameters that specify the type of each of service endpoints 304 and a mobility profile associated with each of service endpoints 304. Specifically, the one or more configuration parameters may indicate whether service endpoints 304 are moving in a predictable manner, such as if service endpoints 304 are low orbit Earth satellites moving according to a pre-determined orbit, or whether service endpoints 304 are not necessarily moving in a predictable manner, such as when service endpoints 304 are drone swarms, tanks, vehicles, and the like.

If communication latency module 314 determines, based on the one or more configuration parameters associated with service endpoints 304, that service endpoints 304 are moving in a predictable manner, communication latency module 314 may be able determine the distance of each of service endpoints 304 from load balancer device 302. For example, communication latency module 314 may be able to access or determine information regarding the locations of each of service endpoints 304 at a particular time. Thus, to determine a current location of each of service endpoints 304, communication latency module 314 may determine the current time, such as by communicating with a network time protocol (NTP) server to receive an indication of the current time, and may use the current time to determine, based on the information regarding the locations of each of service endpoints 304 at a particular time, the location of each of service endpoints 304. Communication latency module 314 may therefore determine the distance of each of service endpoints 304 from load balancer device 302.

If communication latency module 314 determines, based on the one or more configuration parameters associated with service endpoints 304, that service endpoints 304 are not moving in a predictable manner, communication latency module 314 might not be able to determine the distance of each of service endpoints 304 from load balancer device 302. In some examples, communication latency module 314 may utilize an out-of-band system, such as a radar or another device external to load balancer device 302, to determine the distance of each of service endpoints 304 from load balancer device 302. For example, communication latency module 314 may communicate with such out-of-band systems or an external device to receive indications of the distance of each of service endpoints 304.

Communication latency module 314 may determine the communication latency of a respective service endpoint of service endpoints 304 based on the distance between load balancer device 302 and the respective service endpoint. The communication latency of a respective service endpoint may therefore depend on factors such as the distance between load balancer device 302 and the respective service endpoint, the physical medium of the communications link, etc. In general, the further away a service endpoint is from load balancer device 302, the greater the communication latency of the service endpoint.

In some examples, if communication latency module 314 determines, based on the one or more configuration parameters associated with service endpoints 304, that service endpoints 304 are not moving in a predictable manner, communication latency module 314 may utilize an in-band technique, such as ping request response, to determine the communication latency of each of service endpoints 304. For example, communication latency module 314 may determine the communication latency of a respective service endpoint of service endpoints 304 by sending pings to the respective service endpoint and receiving responses to the pings sent by the respective service endpoint. Communication latency module 314 may determine a round trip time for a ping as the duration from which communication latency module 314 sends a ping to the respective service endpoint until communication latency module 314 receives the response to the ping. Communication latency module 314 may determine the communication latency of the respective service endpoint based at least in part on the round trip times of pings sent to the respective service endpoint, such as determining the communication latency to be the average round trip times of pings sent to the respective service endpoint divided by two.

Compute latency module 316 may be configured to determine the compute latency of each of service endpoints 304. The compute latency of a service endpoint may be latency caused by the processing load of the service endpoint. Compute latency module 316 may determine the compute latency of a service endpoint based at least in part on the resource utilization telemetry of the service endpoint. In some examples, compute latency module 316 may receive resource utilization telemetry, such as central processing unit (CPU) utilization, memory utilization, disk input/output, etc., every second for each of service endpoints 304, and may determine, for each service endpoint, the compute latency of the service endpoint based at least in part on the resource utilization telemetry of the service endpoint.

In some examples, compute latency module 316 may also receive, from data module 322, information associated with data sent to and received from service endpoints 304. Such information associated with data sent to and received from service endpoints 304 may include the data packets that are sent to and received from service endpoints 304, and each data packet may include a timestamp indicating the time at which the data packet was sent or received and information that specifies the backend port that sent or received the data packet. In some examples, the information associated with data sent to and received from service endpoints 304 might not include the data packets that are sent to and received from service endpoints 304, but may instead include, for each data packet, a timestamp indicating the time at which the data packet was sent or received and information that specifies the backend port that sent or received the data packet.

Compute latency module 316 may use the resource utilization telemetry of service endpoints 304 and the information associated with data sent to and received from service endpoints 304 to build a compute latency model that can be used by compute latency module 316 to determine the compute latency of each of service endpoints 304. Compute latency module 316 is described in further detail below with respect to FIG. 3C.

Control module 320 may be configured to determine the latency values for each of service endpoints 304 based on the communication latency of the service endpoint and the compute latency of the service endpoint. Specifically, control module 320 may determine the latency value of a service endpoint as a sum of the communication latency of the service endpoint, as determined by communication latency module 314, and the compute latency of the service endpoint, as determined by compute latency module 316. Control module 320 may store associations of service endpoints 304 and latency values. For example, control module 320 may store, in memory, a table of backend ports 308 and associated latency values, where each backend port in the table represents a service endpoint of services endpoints 304 connected to the backend port.

Data module 322 may be configured to receive data 310 and to route data 310 to one or more of service endpoints 304 for processing. In particular, data module 322 may perform load balancing of service endpoints 304 by routing data 310 received by load balancer device 302 to the service endpoint having the lowest latency value out of service endpoints 304. For example, data module 322 may use the table stored in memory by control module 320 to determine the backend port having the lowest associated latency value and to route data through the backend port having the lowest associated latency value to the service endpoint connected to the backend port.

As shown in FIG. 3C, compute latency module 316 is configured to determine a predicted compute latency of each of service endpoints 304. Compute latency module 316 may include telemetry receiver 332, prediction module 334, and modeling module 336, which may be software applications, services, and the like that include instructions that are executed by one or more processors of load balancer device 302.

Telemetry receiver 332 may be configured to receive resource utilization telemetry, such as CPU utilization, memory utilization, disk input/output, etc., every second for each of service endpoints 304, and may determine, for each service endpoint, a predicted compute latency of the service endpoint based at least in part on the resource utilization telemetry of the service endpoint.

Prediction module 334 may be configured to determine, based at least in part on the resource utilization telemetry of each of service endpoints 304, a predicted compute latency of each of service endpoints 304 communicably coupled to load balancer device 302. Prediction model 334 may determine the predicted compute latency of each of service endpoints 304 using a compute latency model, such as a neural network trained via machine learning, or a model developed using linear regression, principal component analysis, and the like.

Modeling module 336 may be configured to generate a compute latency model that is used by prediction module 334 to determine a predicted compute latency of each of service endpoints 304. Modeling module 336 may receive, from communication latency module 314, the communication latency of each of service endpoints 304. Specifically, modeling module 336 may receive a history of communication latencies of each of service endpoints 304 at previous points in time as well as the current communication latency of each of service endpoints 304.

Modeling module 336 may receive, from data module 322, information associated with data sent to and received from service endpoints 304. The information associated with data sent to and received from service endpoints 304 may be information associated with the data packets that are sent and received by load balancer device 302 to and from service endpoints 304, such as, for each data packet, a timestamp indicating the time at which the data packet was sent or received and information that specifies the backend port that sent or received the data packet.

In some examples, information associated with data sent to and received from service endpoints 304 may be the data packets that are sent to and received from service endpoints 304. Data module 322 may include, in each of the data packets sent to modeling module 336, a timestamp of when the data packet was sent or received by load balancer device 302 as well as an indication of the service endpoint that sent or received the data packet, and may send the data packets to modeling module 336.

In some examples, data module 322 might not send the actual data packets to modeling module 336. Instead, data module 322 may send information associated with data sent to and received from service endpoints 304 in the form of metadata associated with the data packets sent to and received from service endpoints 304. The metadata associated with a data packet may include a data structure that specifies a timestamp of when the data packet was sent or received by load balancer device 302 as well as an indication of the service endpoint that sent or received the data packet.

Modeling module 336 may use the history of communication latencies received from communication latency module 314 and the information associated with data sent to and received from service endpoints 304 to determine the actual compute latencies of each of service endpoints 304 to process the data sent to service endpoints 304. For example, modeling module 336 may be able to determine the compute latency of a service endpoint to process a particular data packet based on the timestamp at which the data packet was sent from load balancer device 302 to the service endpoint and the timestamp at which a return data packet was subsequently received by the load balancer device 302 from the same service endpoint to calculate a round trip time to process the data packet sent to the service endpoint as the difference between the two timestamps.

Modeling module 336 may determine, from the history of communication latencies received from communication latency module 314, the communication latency of the service endpoint at the timestamp at which the data packet was sent from load balancer device 302 and subtract the communication latency of the service endpoint from the round trip time to process the data packet. Modeling module 336 may also determine, from the history of communication latencies received from communication latency module 314, the communication latency of the service endpoint at the timestamp at which the return data packet was subsequently received by load balancer device 302, and subtract the communication latency of the service endpoint from the round trip time to process the data packet.

The resulting time period from subtracting the two communication latencies from the round trip time to process the data packet may be the actual compute latency of the service endpoint to process the data packet. In this way, modeling module 336 may be able to determine, for data previously sent by load balancer device 302 to service endpoints 304, the actual compute latencies of service endpoints 304 to process the data previously sent by load balancer device 302 to service endpoints 304.

Modeling module 336 may also be able to determine the resource utilization telemetry of service endpoints 304 while processing the data previously sent by load balancer device 302 to service endpoints 304. Because service endpoints 304 may continuously, such as every second, stream resource utilization telemetry to load balancer device 302, load balancer device 302 may receive and a history of resource utilization telemetry from service endpoints 304. Load balancer device 302 may therefore store the resource utilization telemetry received from service endpoints 304, and may associate each of the received resource utilization telemetry with a timestamp of when the resource utilization telemetry was received by load balancer device 302 and the service endpoint that streamed the resource utilization telemetry.

Modeling module 336 may therefore be able to determine an association of the actual compute latency of a service endpoint to process a data packet with the resource utilization telemetry of the same service endpoint at the time the service endpoint processed the data packet. For example, modeling module 336 may use the timestamp of when the data packet was sent by load balancer device 302 to a service endpoint to determine the resource utilization telemetry of the same service endpoint that is associated with the same timestamp as when the data packet was sent by load balancer device 302.

Modeling module 336 may generate, based at least in part on the actual compute latencies of the plurality of data transmitted by the computing device to the plurality of service endpoints and the resource utilization telemetry from each of the plurality of service endpoints, a compute latency model. For example, modeling module 336 may use, as training data, actual compute latencies of previous data packets sent to service endpoints 304 and the resource utilization telemetry of the service endpoints 304 when processing the previous data packets to perform machine leaning to train a compute latency model as a neural network that can receive, as input, resource utilization telemetry of a service endpoint and output, based on the input, a predicted compute latency for the service endpoint.

In some examples, instead of or in addition to training a neural network model as the compute latency model, modeling module 336 may also generate a compute latency model that can receive, as input, resource utilization telemetry of a service endpoint and output, based on the input, a predicted compute latency for the service endpoint using principal component analysis, linear regression, or any other suitable techniques. Modeling module 336 may, upon generating a compute latency model, communicate the compute latency model to prediction module 334 to be used to predict the compute latencies of service endpoints 304.

Figure 4:
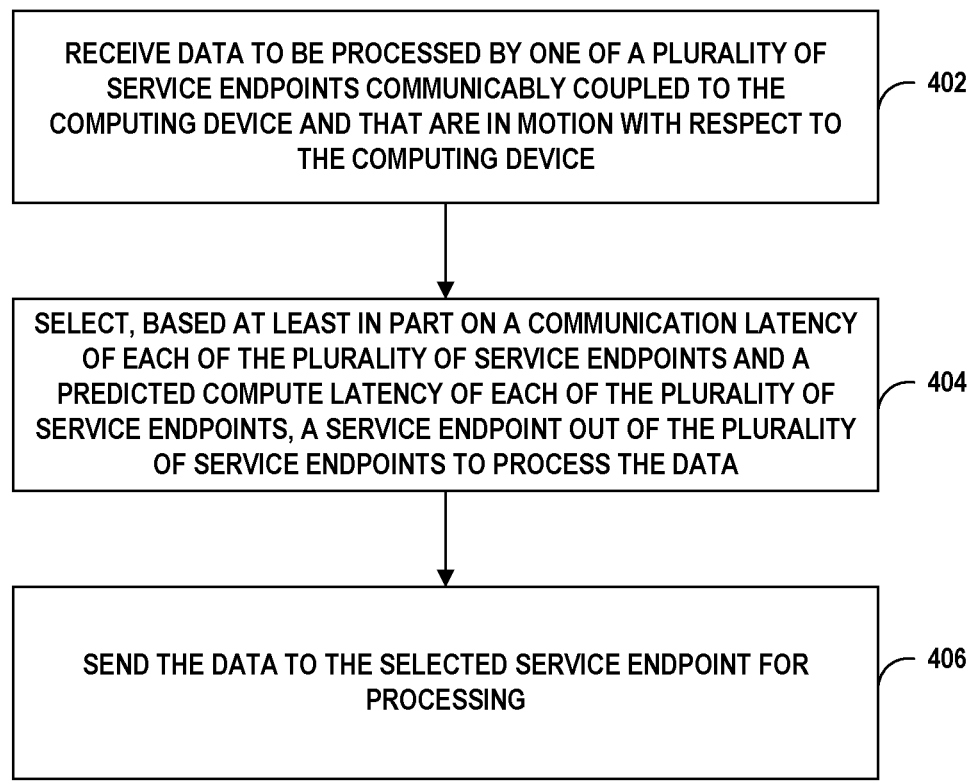
FIG. 4 is a flow diagram illustrating an example technique for performing load balancing, according to techniques described in this disclosure.

FIG. 4 is a flow diagram illustrating an example technique for performing load balancing, according to techniques described in this disclosure. For purposes of example, the operations are described with respect to components of load balancing device 302 of FIGS. 3A-3C.

As shown in FIG. 4, computing device 302 may receive data to be processed by one of a plurality of service endpoints 304 communicably coupled to the computing device 302 and that are in motion with respect to the computing device 302 (402). Computing device 302 may select, based at least in part on a communication latency of each of the plurality of service endpoints 304 and a predicted compute latency of each of the plurality of service endpoints 304, a service endpoint out of the plurality of service endpoints 304 to process the data (404). Computing device 302 may send the data to the selected service endpoint for processing (406).

In some examples, computing device 302 may receive resource utilization telemetry from each of the plurality of service endpoints 304 and may determine, based at least in part on the resource utilization telemetry, the predicted compute latency of each of the plurality of service endpoints 304. In some examples, to determine the predicted compute latency of each of the plurality of service endpoints 304, the computing device 302 may determine, using a modeling service 336, actual compute latencies of a plurality of data sent by the computing device 302 to the plurality of service endpoints 304, generate, using the modeling service 336 and based at least in part on the actual compute latencies of the plurality of data sent by the computing device 302 to the plurality of service endpoints 304 and the resource utilization telemetry from each of the plurality of service endpoints 304, a compute latency model, and determine, using the compute latency model, the predicted compute latency of each of the plurality of service endpoints 304.

In some examples, to generate the compute latency model, the computing device 302 may train, using the modeling service 336, the compute latency model using the actual compute latencies of the plurality of data sent by the computing device 302 to the plurality of service endpoints 304 and the resource utilization telemetry from each of the plurality of service endpoints 304 to generate the compute latency model that is trained to receive, as input, an indication of the resource utilization telemetry of a service endpoint and to output the predicted compute latency of the service endpoint.

In some examples, to select the service endpoint to process the data, computing device 302 may determine a distance between the computing device 302 and each of the plurality of service endpoints 304, and determine, based at least in part on the distance between the computing device 302 and each of the plurality of service endpoints 304, the communication latency of each of the plurality of service endpoints 304.

In some examples, to determine the distance between the computing device 302 and each of the plurality of service endpoints 304, the computing device 302 may send a ping to each of the plurality of service endpoints 304, in response to sending the ping each of the plurality of service endpoints 304, receive a response from each of the plurality of service endpoints 304, and determine, based at least in part on the ping sent to and the response received from each of the plurality of service endpoints 304, the distance between the computing device and each of the plurality of service endpoints 304.

In some examples, to determine the distance between the computing device 302 and each of the plurality of service endpoints 304, the computing device 302 may receive, from an external ranging system, indications of the distance between the computing device 302 and each of the plurality of service endpoints 304.

Aspects of this disclosure may include the following examples:

Example 1: A method includes receiving, by a computing device communicably coupled to a plurality of service endpoints that are in motion with respect to the computing device, data to be processed; selecting, by the computing device and based at least in part on a communication latency of each of the plurality of service endpoints and a predicted compute latency of each of the plurality of service endpoints, a service endpoint out of the plurality of service endpoints to process the data; and sending, by the computing device, the data to the selected service endpoint for processing.

Example 2: The method of example 1, further includes receiving, by the computing device, resource utilization telemetry from each of the plurality of service endpoints; and determining, by the computing device based at least in part on the resource utilization telemetry, the predicted compute latency of each of the plurality of service endpoints.

Example 3: The method of example 2, wherein determining the predicted compute latency of each of the plurality of service endpoints further comprises: determining, using a modeling service at the computing device, actual compute latencies of a plurality of data transmitted by the computing device to the plurality of service endpoints; generating, by the modeling service at the computing device and based at least in part on the actual compute latencies of the plurality of data transmitted by the computing device to the plurality of service endpoints and the resource utilization telemetry from each of the plurality of service endpoints, a compute latency model; and determining, by the computing device and using the compute latency model, the predicted compute latency of each of the plurality of service endpoints.

Example 4: The method of example 3, wherein generating the compute latency model further comprises: training, by the modeling service at the computing device, the compute latency model using the actual compute latencies of the plurality of data transmitted by the computing device to the plurality of service endpoints and the resource utilization telemetry from each of the plurality of service endpoints to generate the compute latency model that is trained to receive, as input, an indication of the resource utilization telemetry of a service endpoint and to output the predicted compute latency of the service endpoint.

Example 5: The method of any of examples 1-4, wherein selecting the service endpoint to process the data further comprises: determining, by the computing device, a distance between the computing device and each of the plurality of service endpoints; and determining, by the computing device and based at least in part on the distance between the computing device and each of the plurality of service endpoints, the communication latency of each of the plurality of service endpoints.

Example 6: The method of example 5, wherein determining the distance between the computing device and each of the plurality of service endpoints further comprises: sending, by the computing device, a ping to each of the plurality of service endpoints; in response to sending the ping each of the plurality of service endpoints, receiving, by the computing device, a response from each of the plurality of service endpoints; and determining, by the computing device and based at least in part on the ping sent to and the response received from each of the plurality of service endpoints, the distance between the computing device and each of the plurality of service endpoints.

Example 7: The method of any of examples 5 and 6, wherein determining the distance between the computing device and each of the plurality of service endpoints further comprises: receiving, by the computing device from an external ranging system, indications of the distance between the computing device and each of the plurality of service endpoints.

Example 8: A computing device includes a memory; processing circuitry coupled to the memory and configured to: receive data to be processed by one of a plurality of service endpoints communicably coupled to the computing device and that are in motion with respect to the computing device; select, based at least in part on a communication latency of each of the plurality of service endpoints and a predicted compute latency of each of the plurality of service endpoints, a service endpoint out of the plurality of service endpoints to process the data; and send the data to the selected service endpoint for processing.

Example 9: The computing device of example 8, wherein the processing circuitry is further configured to: receive resource utilization telemetry from each of the plurality of service endpoints; and determine, based at least in part on the resource utilization telemetry, the predicted compute latency of each of the plurality of service endpoints.

Example 10: The computing device of example 9, wherein to determine the predicted compute latency of each of the plurality of service endpoints, the processing circuitry is further configured to: determine, using a modeling service, actual compute latencies of a plurality of data sent by the computing device to the plurality of service endpoints; generate, using the modeling service and based at least in part on the actual compute latencies of the plurality of data sent by the computing device to the plurality of service endpoints and the resource utilization telemetry from each of the plurality of service endpoints, a compute latency model; and determine, using the compute latency model, the predicted compute latency of each of the plurality of service endpoints.

Example 11: The computing device of example 10, wherein to generate the compute latency model, the processing circuitry is further configured to: train, by the modeling service, the compute latency model using the actual compute latencies of the plurality of data sent by the computing device to the plurality of service endpoints and the resource utilization telemetry from each of the plurality of service endpoints to generate the compute latency model that is trained to receive, as input, an indication of the resource utilization telemetry of a service endpoint and to output the predicted compute latency of the service endpoint.

Example 12: The computing device of any of examples 8-11, wherein to select the service endpoint to process the data, the processing circuitry is further configured to: determine a distance between the computing device and each of the plurality of service endpoints; and determine, based at least in part on the distance between the computing device and each of the plurality of service endpoints, the communication latency of each of the plurality of service endpoints.

Example 13: The computing device of example 12, wherein to determine the distance between the computing device and each of the plurality of service endpoints, the processing circuitry is further configured to: send a ping to each of the plurality of service endpoints; in response to sending the ping each of the plurality of service endpoints, receive a response from each of the plurality of service endpoints; and determine, based at least in part on the ping sent to and the response received from each of the plurality of service endpoints, the distance between the computing device and each of the plurality of service endpoints.

Example 14: The computing device of any of examples 12 and 13, wherein to determine the distance between the computing device and each of the plurality of service endpoints, the processing circuitry is further configured to: receive, from an external ranging system, indications of the distance between the computing device and each of the plurality of service endpoints.

Example 15: A computer-readable storage medium includes receive data to be processed by one of a plurality of service endpoints communicably coupled to the computing device and that are in motion with respect to the computing device; select, based at least in part on a communication latency of each of the plurality of service endpoints and a predicted compute latency of each of the plurality of service endpoints, a service endpoint out of the plurality of service endpoints to process the data; and send the data to the selected service endpoint for processing.

Example 16: The computer-readable storage medium of example 15, wherein the instructions further cause the programmable processor to: receive resource utilization telemetry from each of the plurality of service endpoints; and determine, based at least in part on the resource utilization telemetry, the predicted compute latency of each of the plurality of service endpoints.

Example 17: The computer-readable storage medium of example 16, wherein the instructions that cause the programmable processor to determine the predicted compute latency of each of the plurality of service endpoints further cause the programmable processor to: determine, using a modeling service, actual compute latencies of a plurality of data sent by the computing device to the plurality of service endpoints; generate, using the modeling service and based at least in part on the actual compute latencies of the plurality of data sent by the computing device to the plurality of service endpoints and the resource utilization telemetry from each of the plurality of service endpoints, a compute latency model; and determine, using the compute latency model, the predicted compute latency of each of the plurality of service endpoints.

Example 18: The computer-readable storage medium of example 17, wherein the instructions that cause the programmable processor to generate the compute latency model further cause the programmable processor to: train, by the modeling service, the compute latency model using the actual compute latencies of the plurality of data sent by the computing device to the plurality of service endpoints and the resource utilization telemetry from each of the plurality of service endpoints to generate the compute latency model that is trained to receive, as input, an indication of the resource utilization telemetry of a service endpoint and to output the predicted compute latency of the service endpoint.

Example 19: The computer-readable storage medium of any of examples 15-18, wherein the instructions that cause the programmable processor to select the service endpoint to process the data further cause the programmable processor to: determine a distance between the computing device and each of the plurality of service endpoints; and determine, based at least in part on the distance between the computing device and each of the plurality of service endpoints, the communication latency of each of the plurality of service endpoints.

Example 20: The computer-readable storage medium of example 19, wherein the instructions that cause the programmable processor to determine the distance between the computing device and each of the plurality of service endpoints further cause the programmable processor to: send a ping to each of the plurality of service endpoints; in response to sending the ping each of the plurality of service endpoints, receive a response from each of the plurality of service endpoints; and determine, based at least in part on the ping sent to and the response received from each of the plurality of service endpoints, the distance between the computing device and each of the plurality of service endpoints.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   determining, by a computing device communicably coupled to a plurality of service endpoints and based on accessing data to be processed, a predicted compute latency of each of the plurality of service endpoints, wherein the predicted compute latency of a respective service endpoint of the plurality of service endpoints is associated with a processing load of the respective service endpoint;
   selecting, by the computing device, a service endpoint out of the plurality of service endpoints to process the data based on a communication latency and the predicted compute latency of the service endpoint; and
   sending, by the computing device, the data to the selected service endpoint for processing.

2. The method of claim 1, further comprising:
   receiving, by the computing device, resource utilization telemetry from each of the plurality of service endpoints; and
   determining, by the computing device and based on the resource utilization telemetry, the predicted compute latency of each of the plurality of service endpoints.

3. The method of claim 2, wherein determining the predicted compute latency of each of the plurality of service endpoints further comprises:
   determining, using a modeling service at the computing device, actual compute latencies of a plurality of data transmitted by the computing device to the plurality of service endpoints;
   generating, by the modeling service at the computing device and based on the actual compute latencies of the plurality of data transmitted by the computing device to the plurality of service endpoints and the resource utilization telemetry from each of the plurality of service endpoints, a compute latency model; and
   determining, by the computing device and using the compute latency model, the predicted compute latency of each of the plurality of service endpoints.

4. The method of claim 3, wherein generating the compute latency model further comprises:
   training, by the modeling service at the computing device, the compute latency model using the actual compute latencies of the plurality of data transmitted by the computing device to the plurality of service endpoints and the resource utilization telemetry from each of the plurality of service endpoints to generate the compute latency model that is trained to receive, as input, an indication of the resource utilization telemetry of a service endpoint and to output the predicted compute latency of the service endpoint.

5. The method of claim 1, wherein selecting the service endpoint to process the data further comprises:
   determining, by the computing device, a distance between the computing device and each of the plurality of service endpoints; and
   determining, by the computing device and based on the distance between the computing device and each of the plurality of service endpoints, the communication latency of each of the plurality of service endpoints.

6. The method of claim 5, wherein determining the distance between the computing device and each of the plurality of service endpoints further comprises:
   sending, by the computing device, a ping to each of the plurality of service endpoints; in response to sending the ping each of the plurality of service endpoints, receiving, by the computing device, a response from each of the plurality of service endpoints; and
   determining, by the computing device and based on the ping sent to and the response received from each of the plurality of service endpoints, the distance between the computing device and each of the plurality of service endpoints.

7. The method of claim 5, wherein determining the distance between the computing device and each of the plurality of service endpoints further comprises:
   receiving, by the computing device from an external ranging system, indications of the distance between the computing device and each of the plurality of service endpoints.

8. A computing device comprising:
   a memory; and
   processing circuitry coupled to the memory and configured to:
      determine, based on accessing data to be processed, a predicted compute latency of each of a plurality of service endpoints communicably coupled to the computing device, wherein the predicted compute latency of a respective service endpoint of the plurality of service endpoints is associated with a processing load of the respective service endpoint;
      select a service endpoint out of the plurality of service endpoints to process the data based on a communication latency and the predicted compute latency of the service endpoint; and
      send the data to the selected service endpoint for processing.

9. The computing device of claim 8, wherein the processing circuitry is further configured to:
   receive resource utilization telemetry from each of the plurality of service endpoints; and
   determine, based on the resource utilization telemetry, the predicted compute latency of each of the plurality of service endpoints.

10. The computing device of claim 9, wherein to determine the predicted compute latency of each of the plurality of service endpoints, the processing circuitry is further configured to:
    determine, using a modeling service, actual compute latencies of a plurality of data sent by the computing device to the plurality of service endpoints;
    generate, using the modeling service and based on the actual compute latencies of the plurality of data sent by the computing device to the plurality of service endpoints and the resource utilization telemetry from each of the plurality of service endpoints, a compute latency model; and
    determine, using the compute latency model, the predicted compute latency of each of the plurality of service endpoints.

11. The computing device of claim 10, wherein to generate the compute latency model, the processing circuitry is further configured to:
    train, using the modeling service, the compute latency model using the actual compute latencies of the plurality of data sent by the computing device to the plurality of service endpoints and the resource utilization telemetry from each of the plurality of service endpoints to generate the compute latency model that is trained to receive, as input, an indication of the resource utilization telemetry of a service endpoint and to output the predicted compute latency of the service endpoint.

12. The computing device of claim 8, wherein to select the service endpoint to process the data, the processing circuitry is further configured to:
- determine a distance between the computing device and each of the plurality of service endpoints; and
- determine, based on the distance between the computing device and each of the plurality of service endpoints, the communication latency of each of the plurality of service endpoints.

13. The computing device of claim 12, wherein to determine the distance between the computing device and each of the plurality of service endpoints, the processing circuitry is further configured to:
- send a ping to each of the plurality of service endpoints;
- in response to sending the ping each of the plurality of service endpoints, receive a response from each of the plurality of service endpoints; and
- determine, based on the ping sent to and the response received from each of the plurality of service endpoints, the distance between the computing device and each of the plurality of service endpoints.

14. The computing device of claim 12, wherein to determine the distance between the computing device and each of the plurality of service endpoints, the processing circuitry is further configured to:
- receive, from an external ranging system, indications of the distance between the computing device and each of the plurality of service endpoints.

15. A non-transitory computer-readable storage medium comprising instructions for causing a programmable processor of a computing device to:
- determine, based on accessing data to be processed, a predicted compute latency of each of a plurality of service endpoints communicably coupled to the computing device, wherein the predicted compute latency of a respective service endpoint of the plurality of service endpoints is associated with a processing load of the respective service endpoint;
- select a service endpoint out of the plurality of service endpoints to process the data based on a communication latency and the predicted compute latency of the service endpoint; and
- send the data to the selected service endpoint for processing.

16. The non-transitory computer-readable storage medium of claim 15, wherein the instructions further cause the programmable processor to:
- receive resource utilization telemetry from each of the plurality of service endpoints; and
- determine, based on the resource utilization telemetry, the predicted compute latency of each of the plurality of service endpoints.

17. The non-transitory computer-readable storage medium of claim 16, wherein the instructions that cause the programmable processor to determine the predicted compute latency of each of the plurality of service endpoints further cause the programmable processor to:
- determine, using a modeling service, actual compute latencies of a plurality of data sent by the computing device to the plurality of service endpoints;
- generate, using the modeling service and based on the actual compute latencies of the plurality of data sent by the computing device to the plurality of service endpoints and the resource utilization telemetry from each of the plurality of service endpoints, a compute latency model; and
- determine, using the compute latency model, the predicted compute latency of each of the plurality of service endpoints.

18. The non-transitory computer-readable storage medium of claim 17, wherein the instructions that cause the programmable processor to generate the compute latency model further cause the programmable processor to:
- train, by the modeling service, the compute latency model using the actual compute latencies of the plurality of data sent by the computing device to the plurality of service endpoints and the resource utilization telemetry from each of the plurality of service endpoints to generate the compute latency model that is trained to receive, as input, an indication of the resource utilization telemetry of a service endpoint and to output the predicted compute latency of the service endpoint.

19. The non-transitory computer-readable storage medium of claim 15, wherein the instructions that cause the programmable processor to select the service endpoint to process the data further cause the programmable processor to:
- determine a distance between the computing device and each of the plurality of service endpoints; and
- determine, based on the distance between the computing device and each of the plurality of service endpoints, the communication latency of each of the plurality of service endpoints.

20. The non-transitory computer-readable storage medium of claim 19, wherein the instructions that cause the programmable processor to determine the distance between the computing device and each of the plurality of service endpoints further cause the programmable processor to:
- send a ping to each of the plurality of service endpoints;
- in response to sending the ping each of the plurality of service endpoints, receive a response from each of the plurality of service endpoints; and
- determine, based on the ping sent to and the response received from each of the plurality of service endpoints, the distance between the computing device and each of the plurality of service endpoints.

\* \* \* \* \*